US012617049B2

(12) United States Patent
Penczak

(10) Patent No.: US 12,617,049 B2
(45) Date of Patent: May 5, 2026

(54) SYSTEM FOR LOCATING FENCES ON DRILL PRESS AND ROUTER TABLES

(71) Applicant: John P. Penczak, Hilliard, OH (US)

(72) Inventor: John P. Penczak, Hilliard, OH (US)

( * ) Notice: Subject to any disclaimer, the term of this patent is extended or adjusted under 35 U.S.C. 154(b) by 904 days.

(21) Appl. No.: 17/901,062

(22) Filed: Sep. 1, 2022

(65) Prior Publication Data

US 2024/0075567 A1 Mar. 7, 2024

Related U.S. Application Data

(60) Provisional application No. 63/239,642, filed on Sep. 1, 2021.

(51) Int. Cl.
B23Q 3/00 (2006.01)

(52) U.S. Cl.
CPC ..................................... B23Q 3/005 (2013.01)

(58) Field of Classification Search
CPC .............................. B23Q 3/005; B25H 1/0078
See application file for complete search history.

(56) References Cited

U.S. PATENT DOCUMENTS

| | | | | | |
|---|---|---|---|---|---|
| 3,733,707 A | * | 5/1973 | Nix | ........................... | H02G 3/12 33/528 |
| 4,294,297 A | * | 10/1981 | Kieffer | ....................... | B27C 5/10 144/371 |
| 5,183,373 A | * | 2/1993 | Floyd, Jr. | ............. | B23Q 1/4804 144/144.51 |
| 5,345,986 A | * | 9/1994 | Kieffer | ................... | B23Q 35/44 144/144.1 |
| 5,385,183 A | * | 1/1995 | Ferranti | .................. | B27B 27/02 269/53 |
| 5,560,408 A | * | 10/1996 | DiFranco | ............... | B23Q 35/02 144/365 |
| 5,988,242 A | * | 11/1999 | Minardi | ................. | B23Q 3/005 144/135.2 |
| 6,305,449 B1 | * | 10/2001 | Stover | ....................... | B27F 1/12 144/135.2 |

(Continued)

FOREIGN PATENT DOCUMENTS

TW 561786 B * 11/2003

OTHER PUBLICATIONS

Product Sheet from Buckeye Fasteners Company for Open Ended: Thumb BF 265521, obtained prior to Sep. 1, 2021 (1 page).

(Continued)

*Primary Examiner* — Yaritza Guadalupe-McCall
(74) *Attorney, Agent, or Firm* — Calfee, Halter & Griswold LLP

(57) ABSTRACT

According to one embodiment, a system for locating a drill press or router table fence comprises a center-post insert having a protrusion located in a central portion of the center-post insert, a center-point template having a plurality of openings sized to closely receive the center-post insert, wherein the openings are located at a range of predetermined distances, and a fence having a securing mechanism, the fence located at a distance set by the center-point template, wherein the center-point template is placed on the center-post insert at a chosen opening, and the fence is secured against the center-point template at a distance determined by the chosen opening.

17 Claims, 9 Drawing Sheets

(56) References Cited

U.S. PATENT DOCUMENTS

| | | | | |
|---|---|---|---|---|
| 6,499,224 | B1 * | 12/2002 | Asick | B23B 47/287 |
| | | | | 83/438 |
| 6,694,635 | B1 * | 2/2004 | Sidebottom | B27M 3/12 |
| | | | | 33/456 |
| 6,901,680 | B2 * | 6/2005 | Locaputo | B27F 1/02 |
| | | | | 144/144.1 |
| 7,421,798 | B2 * | 9/2008 | Pattee | B23Q 9/005 |
| | | | | 33/534 |
| 8,584,372 | B2 * | 11/2013 | Stoffel | G01B 5/25 |
| | | | | 33/832 |
| 9,221,188 | B1 * | 12/2015 | Wisen | B27B 27/10 |
| 10,239,170 | B2 * | 3/2019 | Chang | B23Q 3/005 |
| 11,738,420 | B2 * | 8/2023 | Wheeler | B27C 5/10 |
| | | | | 144/144.52 |
| 2004/0187335 | A1 * | 9/2004 | Locaputo | B27C 5/06 |
| | | | | 33/642 |
| 2007/0199620 | A1 * | 8/2007 | Fontaine | B27C 5/02 |
| | | | | 144/286.1 |
| 2008/0178486 | A1 * | 7/2008 | Pattee | B27G 5/023 |
| | | | | 33/640 |
| 2008/0210338 | A1 * | 9/2008 | Ponce | B23Q 9/0042 |
| | | | | 144/144.51 |
| 2024/0075567 | A1 * | 3/2024 | Penczak | B23Q 3/005 |

OTHER PUBLICATIONS

Product Sheet from Buckeye Fasteners Company for Open Ended:
Thumb BF 365371, obtained prior to Sep. 1, 2021 (1 page).
Rockler Woodworking and Hardware Drill Press Fence Instructions
Brochure, Oct. 2017 (8 pages).

* cited by examiner

9

9

7

8

7

111

SYSTEM FOR LOCATING FENCES ON DRILL PRESS AND ROUTER TABLES

CROSS-REFERENCE TO RELATED APPLICATION

This application claims priority to and all benefit of U.S. Provisional Patent Application Ser. No. 63/239,642, filed Sep. 1, 2021 and entitled SYSTEM FOR LOCATING FENCES ON DRILL PRESS AND ROUTER TABLES, the entire disclosure of which is incorporated herein by reference.

TECHNICAL FIELD

The present invention generally relates to the positioning of a drill press or router fence on a drill press or router table. In particular, the present invention relates to a distance template that allows for an accurate installation of a drill press or router fence depending on the location of the template.

BACKGROUND OF THE INVENTION

Currently, an easy, foolproof and universal method is not available to set a drill press or router fence at the exact distance from the center point of a drill bit or router bit to the face of the drill press or router fence. The drill press or router fence can be made using a plethora of materials and acts as a stopper for a workpiece to be pressed against. The fence may be locked in place and allow for accurate and repeated drilling or routing.

Several tools such as a tape measure or flat ruler can be used but often result in off-center mistakes even if you measure twice. Shims can be placed between the fence and drill bit or router bit, but one half the diameter of the bit must be added to get the centerline dimension and multiple shims may be required. Other tools can measure to the center but still require reading a rule or digital scale. Each new fence location requires a new reading and possibly a new mistake.

SUMMARY

According to one embodiment, a system for locating a drill press or router table fence comprises a center-post insert having a protrusion located in a central portion of the center-post insert, a center-point template having a plurality of openings sized to closely receive the center-post insert, wherein the openings are located at a range of predetermined distances, and a fence having a securing mechanism, the fence located at a distance set by the center-point template, wherein the center-point template is placed on the center-post insert at a chosen opening, and the fence is secured against the center-point template at a distance determined by the chosen opening.

According to another embodiment, a method for operating a system for locating a drill press or router table fence comprises placing a center-post insert into an inset recess on a workshop table, placing a center-point template on top of the center-post insert using one of a plurality of openings sized to closely receive the center-post insert, positioning a fence along an edge of the center-point template at a position determined by the selected opening, securing the fence against the center-point template using a securing mechanism, removing the center-point template and the center-post insert from the inset recess, placing a blank insert into the inset recess, and positioning a workpiece against the fence.

According to yet another embodiment, a method for operating a system for locating a drill press or router table fence comprises placing a blank insert into an inset recess on a workshop table, inserting a drill press bit or router bit into a center-point template using one of a plurality of openings sized to closely receive the drill press bit or router bit, positioning a fence along an edge of the center-point template at a position determined by the selected opening, securing the fence against the center-point template using a securing mechanism, removing the center-point template, and positioning a workpiece against the fence.

According to another exemplary embodiment, a system for locating a drill press or router table stop along the Y axis comprises a center-post insert having a protrusion located in a center portion of the center-post insert, wherein the openings are located at a range of predetermined distances a center-point template having a plurality of openings sized to closely receive the center-post insert, a center-point fence having multiple sliding stops, wherein the center-point template is placed on the center-post at a chosen opening from the fence center point to the stop, and the fence is set along one side of the template and the sliding stop is set against the adjacent side.

According to another exemplary embodiment, a fence for locating a workpiece on a work table includes an elongated fence body, a guide bar, and a stop assembly. The guide bar is secured to the bottom surface of the elongated fence body and extends perpendicular to the elongated body, the guide bar being sized to be received in a slot in the work table. The stop assembly includes a threaded nut, a set screw, stop body, and a thumb nut. The threaded nut is receivable in a bottom recess of a longitudinally extending track in the upper surface of the elongated fence body. The set screw is threadably engageable with the threaded nut and has a threaded shaft portion and a head portion extending from the top surface of the elongated fence body, such that the set screw may be tightened to clamp the threaded nut against an upper portion of the bottom recess of the longitudinally extending track. The stop body includes a block portion positionable against the front surface of the elongated fence body and an upper flange extending rearward of the block portion to overhang the top surface of the elongated fence body. The upper flange includes a cutout that aligns with a longitudinally extending track in the upper surface of the elongated fence body to receive the shaft portion of the set screw therein. The thumb nut is threadably receivable on the threaded shaft portion of the set screw and is tightenable against the upper flange of the stop body to secure the stop body in a selected position along the longitudinally extending track of the elongated fence body.

BRIEF DESCRIPTION OF THE DRAWINGS

These and other features and advantages of the present invention will become better understood with regard to the following description, appended claims, and accompanying drawings wherein:

DETAILED DESCRIPTION

Figures 1, 2:
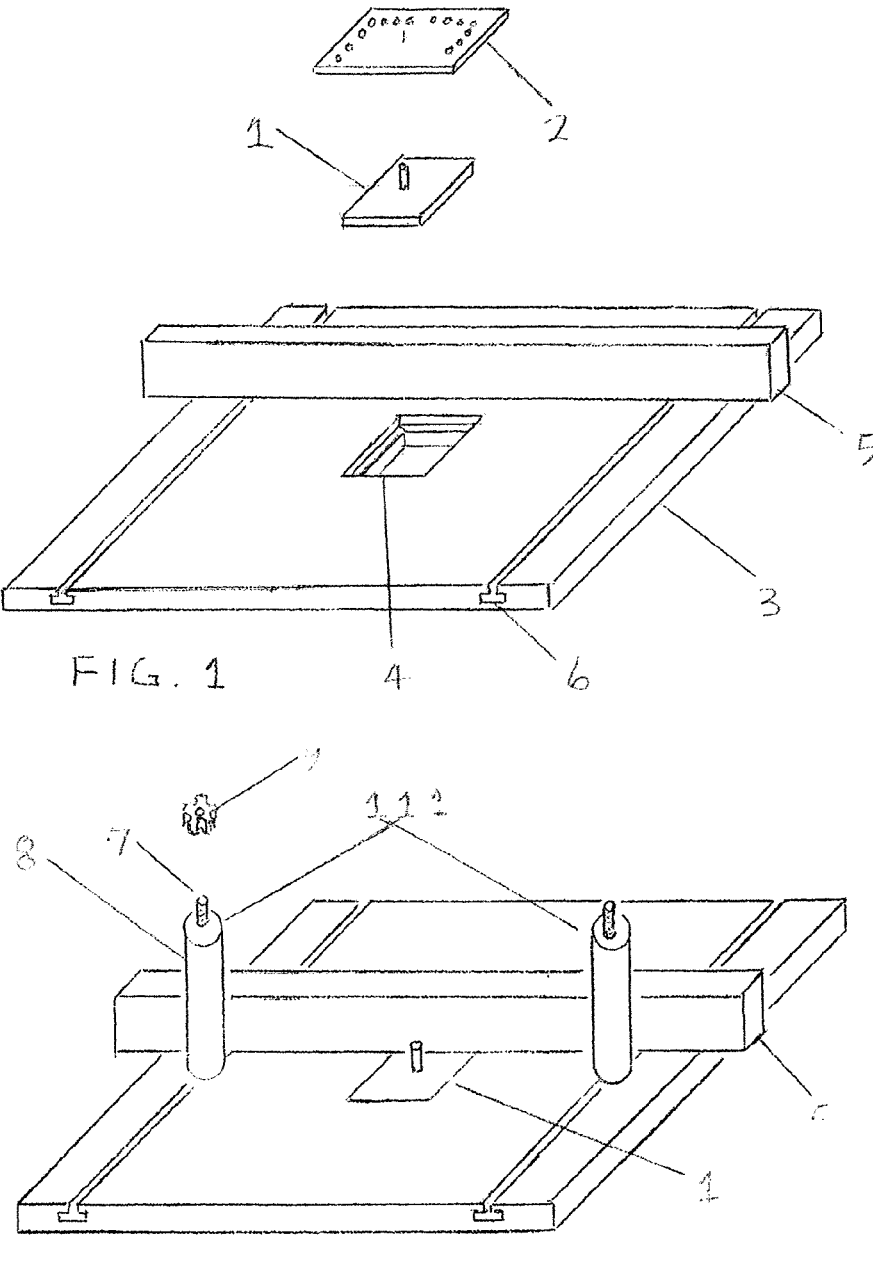
FIG. 1 is a perspective view of a fence and drill press system that includes a center-point template, a table, a fence, and a center-post insert, according to an exemplary arrangement of the present disclosure.
FIG. 2 is a perspective view of a fence and drill press system, shown with two dowel rod stops and center-post insert placed into the recess, according to an exemplary arrangement of the present disclosure.

While various inventive aspects, concepts and features of this invention may be described and illustrated herein as embodied in combination in the exemplary embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions-such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified values and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure contemplates system s and methods for locating and maintaining the center-point fence exactly centered with the drill bit or router bit, the fence having one or two sliding guide bar assemblies, the guide bars able to fit any location and any width of T-slots on tables.

The exemplary center-point templates described herein greatly improve locating holes along the X axis and when used with a center-point fence described herein, holes along the Y axis can also be easily and accurately located. The center-point fence has a T-slot on the top surface and one or two T-slots along the back side. One of back side T-slots can contain a bar to connect another length of fence. The second T-slot receives one or two sliding guide bar assemblies. The bar assembly or assemblies prevent the fence from moving off center.

FIG. 1 illustrates an exemplary fence location system 10 having a typical drill press or router table 3 with a fence 5 located and set at a distance beyond a drill bit, router bit, or other tools. A center-post insert 1 can be inserted into a square, rectangular, circular, or other shaped recess 4 to hold the center-post insert 1. A center-point template 2 can then be placed on top of the center-post insert 1 using a plurality of openings sized to closely receive the center-post insert 1. The fence 5 can then be positioned along the edge of the center-point template 2 at a position determined by the selected opening and locked in place. In an exemplary embodiment, the fence is locked in place using T-bolts inserted into the table T-slot 6 and through an opening in the fence. A clamping knob or nut secures the fence to the table. The center-point template 2 and the center-post insert 1 can then be removed and replaced with a standard blank insert. The center-post insert 1 can be the same size as a standard blank insert. A workpiece can then be positioned against the fence 5 for proper drilling or routing. The pattern and size of the template 2 shown can be easily changed. For example, changing the spacing, location, number of openings, or size of the template 2 will continue to include all of the unique features and benefits of this measuring system. It is to be appreciated that the template 2 can be any suitable rigid or flexible material, including, for example, wood, plastic, or aluminum.

FIG. 2 illustrates an exemplary fence location system 10 having a typical drill press or router table 3, a fence 5 located at a set distance, a center-post insert 1, and two dowel rod stops 111. The dowel rod stops 111 can be used in situations where the fence 5 overlaps the center-post insert 1 and prevents the insert 1 from being removed and replaced with a blank insert. The dowel rod stops 111 comprise two dowels 8, the dowels 8 having a T-bolt 7 installed at the opposite flat end of each dowel 8, the T-bolt 7 used to slide the dowel 8 along the T-track 6 to a desired location, with an upper threaded end of the T-bolt 7 configured to receive a clamping knob 9 to secure the dowels 8 to the table 3. After fixing the fence 5 to a distance set by the center-point template 2, the dowel rod stops 111 are slid flush against the fixed fence 5 and clamped to the table 3 with clamping knobs 9. The fence 5 may now be removed, allowing the center-post insert 1 to be removed from the recess 4, and allowing a typical blank insert to be installed in the recess 4. The fence 5 may now be repositioned against the dowel rod stops 111, and the dowel rod stops 111 may be removed after the fence 5 is locked in place.

Figure 3:
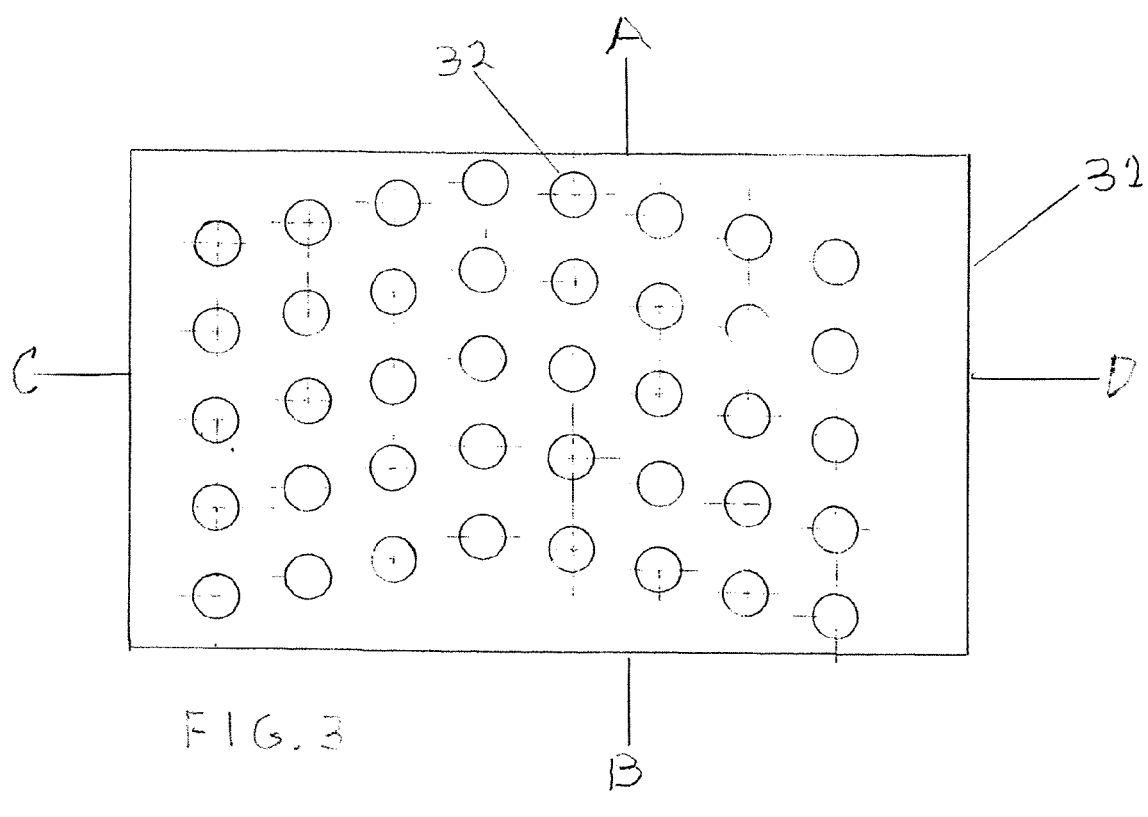
FIG. 3 is a top view of a center-point template with forty openings, according to an exemplary arrangement of the present disclosure.
Figure 4:
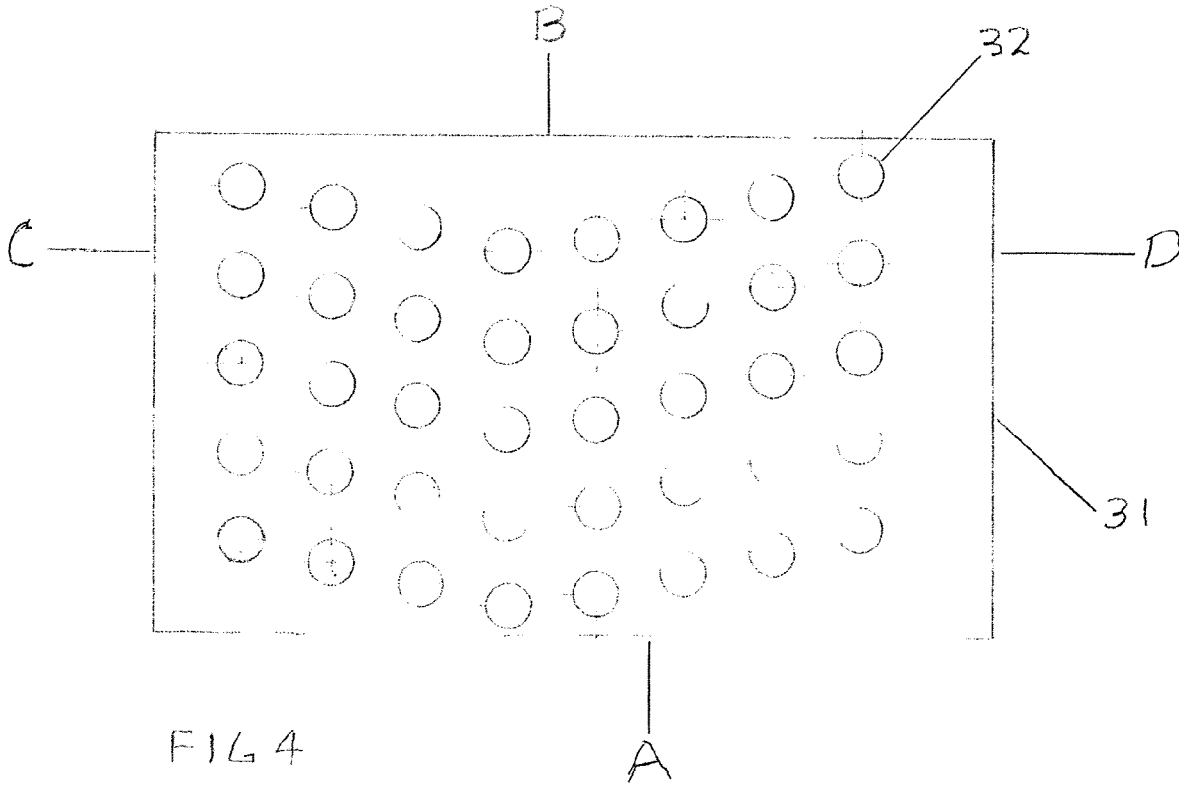
FIG. 4 is a bottom view of the center-point template of FIG. 3.

FIGS. 3 and 4 illustrate an exemplary typical center-point template with forty openings 31. Each opening may be is marked with dimensions from the edge of the template to the center of the opening. The openings 32 are arranged along two sets of parallel lines forming opposite angled parallelograms, together forming a chevron shaped array of openings. The openings 32 are sized to closely receive the protrusion of the center-post insert 1, a router bit, and a drill press bit. The parallelogram layout allows for rows and columns of openings to be offset with each other, providing a greater plurality of distances and openings than if the layout was a square or rectangle. The exemplary sets are mirrored and are offset with each other by ¹⁄₁₆". The exemplary sets contain twenty openings 32 that are vertically and horizontally spaced ½" apart from each adjacent opening. Each column in each set is vertically offset by its adjacent column by ⅛". For example, in the illustrated embodiment of FIG. 3, starting at the bottom row, the left-most opening on the left-hand set is located at ½"×2⁹⁄₁₆". The immediately adjacent opening to its right is located at 1"×2⁷⁄₁₆". This ½"×–⅛" opening offset continues until the last opening on the left-hand set. Starting at the bottom row, the left-most opening on the right-hand set is located at 2½"×2¼". The immediately adjacent opening to its right is located at 3"×2⅜". This ½"×⅛" opening offset continues until the last opening on the right-hand set. This scaling repeats for each subsequent row on the template, with each row starting at the left-most opening on the left-hand set at ½"×2¹⁄₁₆", ½"×1⁹⁄₁₆", ½"×1¹⁄₁₆", and ½"×⁹⁄₁₆", respectively. It is to be appreciated that the center-point template 31 may be rotated 90 degrees or 270 degrees to use the plurality of openings 32 at additional distances, with the left-hand set located ½" away from the left template edge and the right-hand set located ¾" away from the right template edge.

Referring again to FIG. 3, starting at the top edge "A" the first hole in the left most opening of the right hand set is ³⁄₁₆' from edge "A". The first hole in the right most opening of the right-hand set is ¼" from edge. This scaling continues for each subsequent row on the template ending with the last hole in the left most opening of the left-hand set at 2⅝" from edge "A". The least hole in the right most opening of the right-hand set at 2⁹⁄₁₆" from edge "A". It is also to be appreciated that the center-point template 31 may be flipped over to orient the plurality of openings 32 with different y-axis measurements for an additional forty measurements. FIG. 4 shows the template flipped over and a new starting location for the first hole in the most opening of the right-hand set is ⁷⁄₃₂" from edge "B". The first hole in the left most opening of left-hand set is ⁹⁄₃₂". The scaling continues to the last two holes located at 2⁵⁄₃₂" and 2⁷⁄₃₂". The exemplary template is shown as a small, pocket-sized template (e.g., 2³⁵⁄₃₂"×4¾") to permit 107 locations of holes to the case of a fence. In other embodiments, different dimensional starting points and incremental offset distances may additionally or alternatively be used. In other embodiments, the template may include fewer or more than 40 openings.

Figures 5, 6:
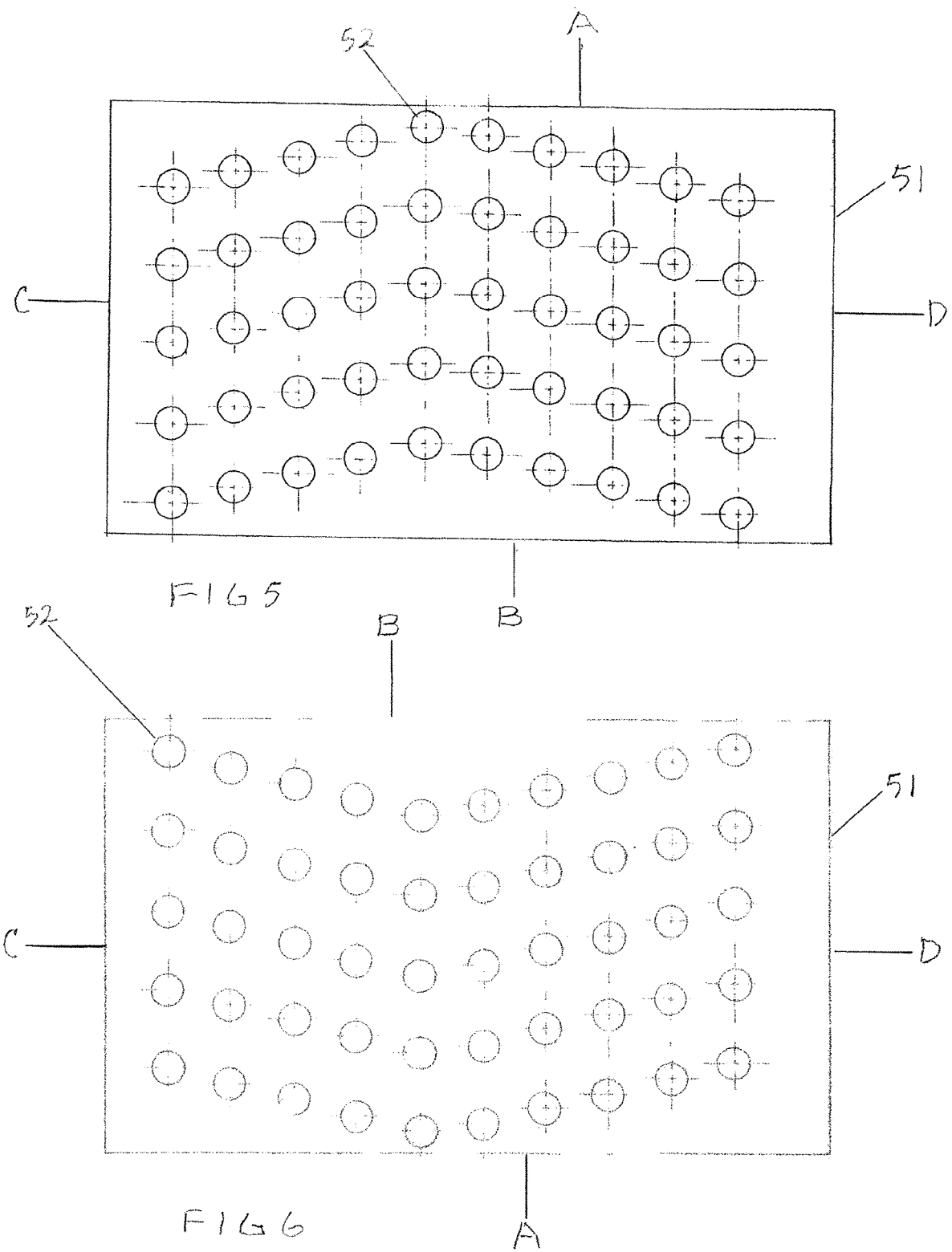
FIG. 5 is a top view of a center-point template with fifty openings, according to an exemplary arrangement of the present disclosure.
FIG. 6 is a bottom view of the center-point template of FIG. 5.

FIGS. 5 and 6 illustrate an exemplary typical center-point template with fifty openings 51. The openings 52 are arranged along two sets of parallel lines forming opposite angled parallelograms having 25 openings each. The openings 52 are sized to closely receive the protrusion of the center-post insert 1 a router bit, and a drill press bit. The parallelogram layout allows for rows and columns of openings to be offset with each other, providing a greater plurality of distances and openings than if the layout was a square or rectangle. The sets are mirrored and are offset with each other by ¹⁄₁₆". The sets contain openings 52 that are vertically spaced ⅝" and horizontally spaced ½" apart from each adjacent opening. Each column in each set is vertically offset by its adjacent column by ⅛". For example, in the illustrated embodiment, starting at the bottom row, the left-most opening on the left-hand set is located at ½"×3³⁄₁₆". The immediately adjacent opening to its right is located at 1"×3¹⁄₁₆". This ½"×–⅛" opening offset continues until the last opening on the left-hand set. Starting at the bottom row, the left-most opening on the right-hand set is located at 3"×2¾". The immediately adjacent opening to its right is located at 3½"×2⅞". This ½"×⅛" opening offset continues until the last opening on the right-hand set. This scaling repeats for each subsequent row on the template, with each row starting at the left-most opening on the left-hand set at ½"×2⁹⁄₁₆", ½"×2⁷⁄₁₆", ½"×2⁵⁄₁₆", and ½"×2³⁄₁₆", respectively. It is to be appreciated that the center-point template 51 may have a perimeter shaped to allow it be rotated 90 degrees or 270 degrees within the recess, to use the plurality of openings 52 at additional distances, with the left-hand set located ¾" away from the left template edge and the right-hand set located ½" away from the right template edge. It is also to be appreciated that the center-point template 51 may be flipped over to orient the plurality of openings 52 with different y-axis measurements for an additional fifty measurements. In other embodiments, different dimensional starting points and incremental offset distances may additionally or alternatively be used. In other embodiments, the template may include more than 50 openings.

Figures 7, 7A, 7B:
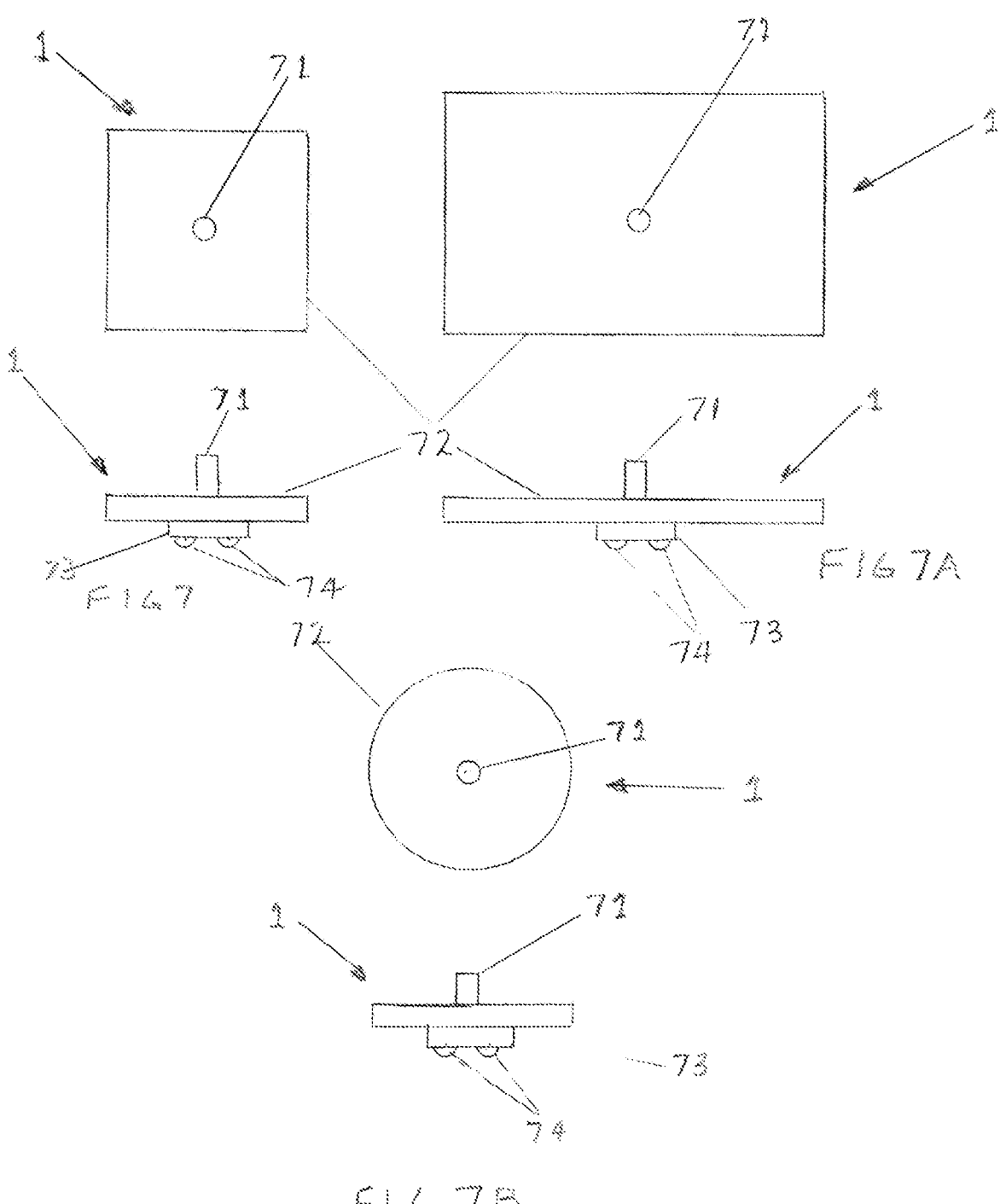
FIG. 7 includes top and side views of a center-post insert, according to an exemplary arrangement of the present disclosure.
FIG. 7A includes top and side views of another center-post insert, according to another exemplary arrangement of the present disclosure.
FIG. 7B includes top and side views of another center-post insert, according to another exemplary arrangement of the present disclosure.

FIGS. 7, 7A, and 7B illustrate an exemplary center-post insert 1 comprising a cylindrical protrusion or post 71, a panel 72, a secondary support piece 73, and two screws 74. The cylindrical protrusion 71 can be of varying size consisting of any suitable rigid or flexible material including, for example, wood, plastic, or aluminum. The cylindrical protrusion 71 can be added to a panel 72 by drilling the center of the panel 72 and attaching a secondary piece 73 with a cylindrical protrusion 71 to the panel 72 with two screws 74. Alternatively, the center-post insert 1 can be a one-piece insert designed to fit a specific drill press or router table. The panel 72 may be provided in a variety of shapes to match a corresponding table recess, including, for example, square (FIG. 7), rectangular (FIG. 7A), or circular (FIG. 7B).

Figure 8:
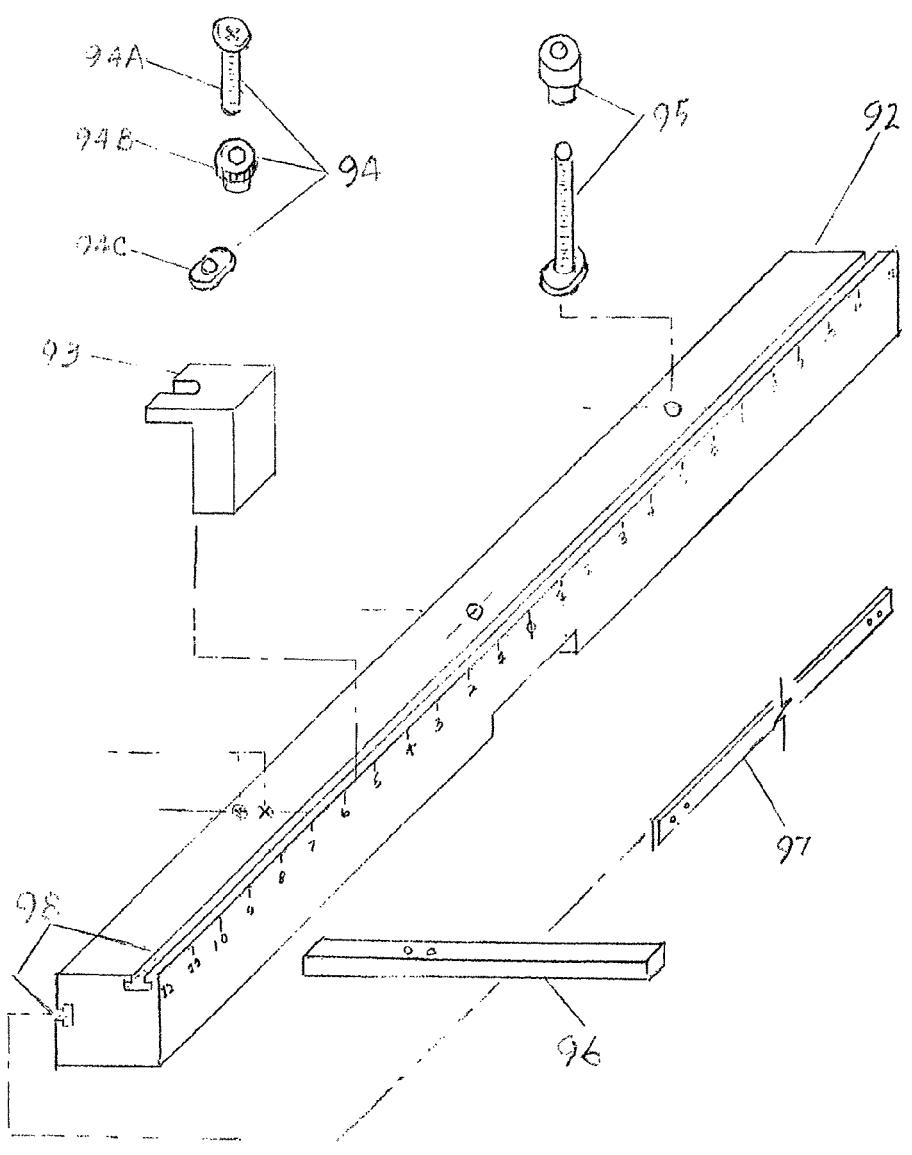
FIG. 8 is an exploded front perspective view of a center-point fence, according to an exemplary arrangement of the present disclosure.

FIG. 8 illustrates an exemplary center-point fence 92 comprising at least one stop 93, at least one set screw with a T-slot nut assembly 94, a clamping knob with a T-bolt 95, a T-square guide bar 96, an extension bar 97, two T-slots 98, and a single dowel rod stop 111. The center-point fence 92 has a hole centered on its top which allows for a drill bit installed on a drill press to be inserted. When inserted, the center-point fence 92 is perfectly centered on a drill press table. The center-point fence 92 may have tape measures or markings located from the exact centerline. Alternatively, the center-point fence 92 may have a slot centered on its top to accept a hook from a standard tape measure to measure either left or right from center. The stops 93 and thumb nuts 94B with T-slot nuts 94C may slide along the first T-slot 98 to preferred distances. The thumb nuts 94B may then lock the stops 93 to the center-point fence 92 at the selected distances. The stops 93 have a U-shaped slot to slide under the thumb nuts 94B and can therefore be removed while keeping the center-point fence 92 and thumb screws 94 in position for repeatable hole locating. The clamping knob with a T-bolt 95 may lock the center-point fence 92 to a drill press or router table 3. The extension bar 97 may be slid into the second T-slot 98 on the center-point fence 92 to allow another center-point fence to be secured to the original center-point fence 92. The center-point fence 92 may use the T-square guide bar 96 to slide along a T-slot in a drill press or router table 3. It is to be appreciated that the exemplary center-point fence 92 is materially low cost and has a low environmental impact compared to other modern commercial drill press or router fences. It is also to be appreciated that the center-point fence 92 and template 2 determine a primary axis of drilling or routing on a workpiece, and the location of the stop 93 determines a secondary axis of drilling or routing on a workpiece.

Figure 9:
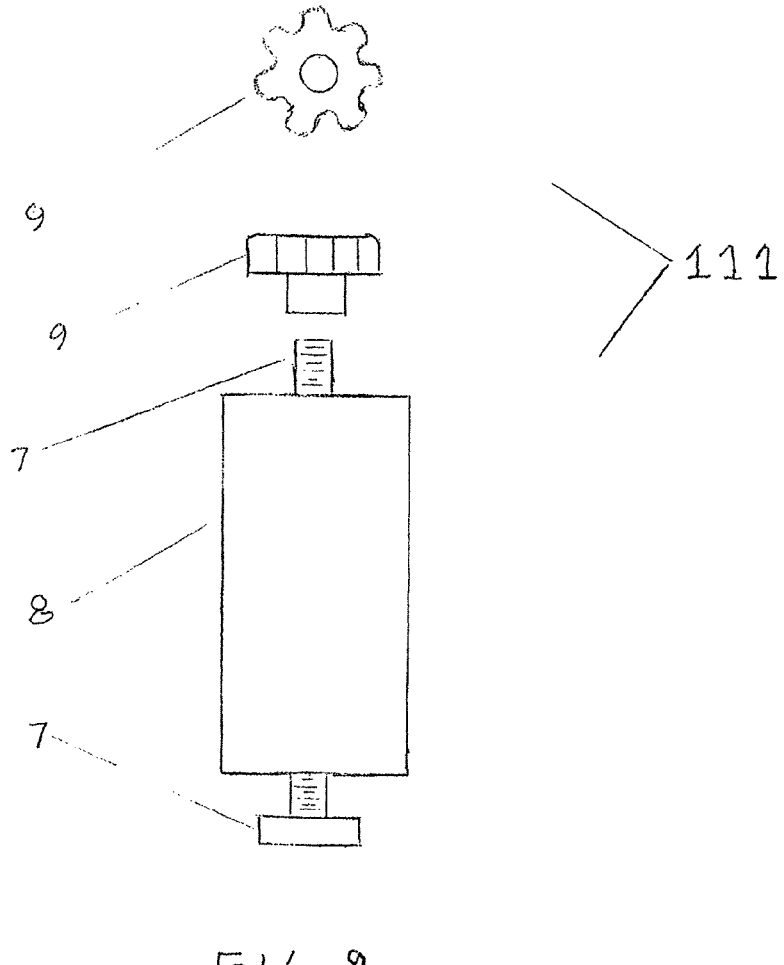
FIG. 9 is an exploded side view of a dowel rod stop assembly, according to another exemplary arrangement of the present disclosure.

FIG. 9 illustrates an exemplary single dowel rod stop 111. The dowel rod stop 111 comprises a dowel 8, the dowel 8 having one T-bolt 7 installed at a flat end of the dowel 8 and one T-bolt 7 installed at the opposite flat end of the dowel 8, the T-bolt 7 used to attach and slide the dowel 8 across a table 3 and the T-bolt 7 configured to receive a clamping knob 9 to secure and tighten the dowel 8 to a table 3. The dowel rod may have a high friction coating to be used to clamp a workpiece to the fence.

An exemplary method for operating a fence system with a center-point fence 92 is described herein. For drill press tables, a drill press bit connected to a drill press machine may be inserted into the template 2 to align the center-point fence 92 to a desired location on the drill press table. In this embodiment, use of the center-post insert 1 is eliminated, and a blank insert can be inserted into the recess 4 in the drill press table. For router tables, a router bit connected to a router machine may be inserted into the template 2 to align the center-point fence 92 to a desired location on the drill press table. In this embodiment, use of the center-post insert 1 is eliminated, and a blank insert can be inserted into the recess 4 in the router table. When the drill press bit or router bit is securely fit through one of the appropriately sized openings located on the template 2, a center-point fence 92 may be positioned along the start edge of the template 2. The center-point fence 92 can then be locked into place using the clamping knob with a T-bolt 95, or any other securing mechanism. The template 2 can be removed at this point. A plurality of thumb nuts 94B with T-slot nuts 94C and set screws 94A may now be slid across the first T-slot 98 to all desired locations. The screw 94A is locked in position. A stop 3 may be inserted under and secured to a singular thumb nut 94B. A workpiece may now be pressed against the center-point fence 92 and stop 93 for exact drilling or routing. It is to be appreciated that the center-point fence 92 and template 2 determine a primary axis of drilling or routing on a workpiece, and the location of the stop 93 determines a secondary axis of drilling or routing on a workpiece.

Alternatively, a center-post insert 1 can be inserted into a square, rectangular, circular, or other shaped recess 13 to hold the center-point insert 1. A template 2 can then be placed on top of the center-post insert 1 using a plurality of openings. The center-point fence 92 can then be set at a specific distance selected from the center-point template 2 and locked in place using the clamping knob with a T-bolt 95, or any other securing mechanism. If the center-point fence 92 is covering the center-post insert 1, a single dowel rod stop 111 may be secured against the center-point fence 92, allowing the center-point fence 92 and template 2 to be removed and the center-post insert 1 swapped out for a blank insert. The center-point fence 92 can then be secured against the single dowel rod stop 111, and the single dowel rod stop 111 may be removed. A plurality of thumb nuts with T-slot nuts assemblies 94 may now be slid across the first T-slot 98 to all desired locations. A stop 3 may be inserted under and secured to a singular thumb screw 94. A workpiece may now be pressed against the center-point fence 92 and stop 93 for exact drilling or routing. It is to be appreciated that the center-point fence 92 and template 2 determine a primary axis of drilling or routing on a workpiece, and the location of the stop 93 determines a secondary axis of drilling or routing on a workpiece.

Figure 10:
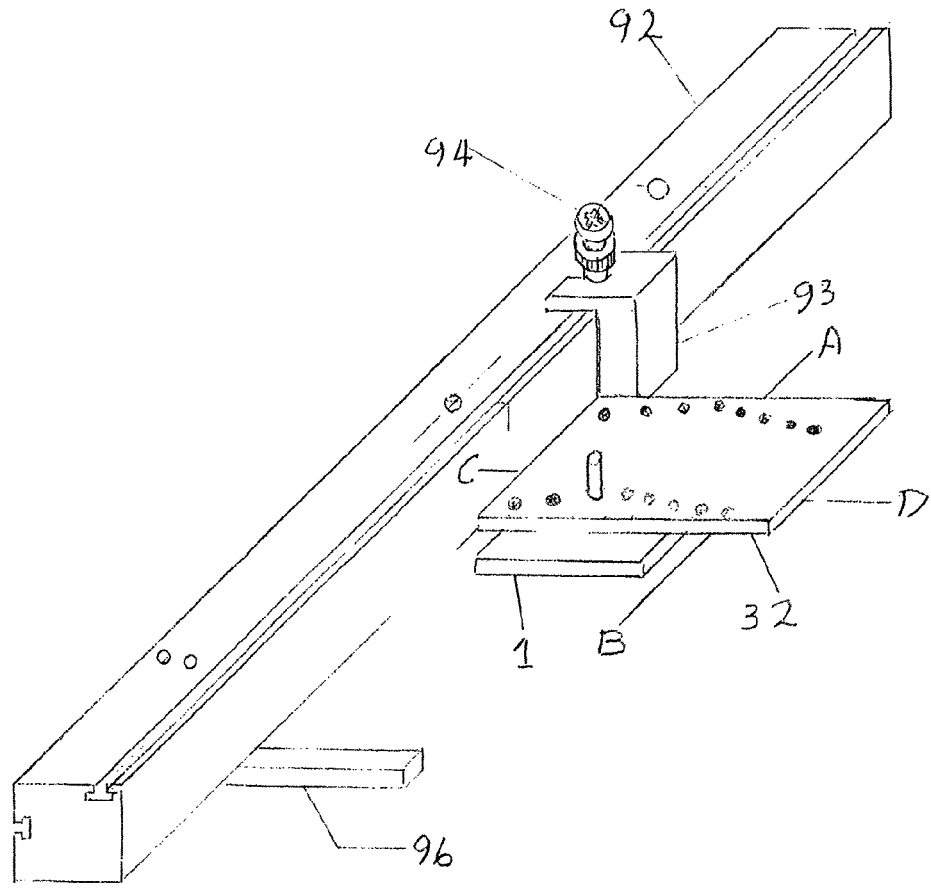
FIG. 10 is a front perspective view of a center-point fence, according to another exemplary arrangement of the present disclosure.
Figure 12:
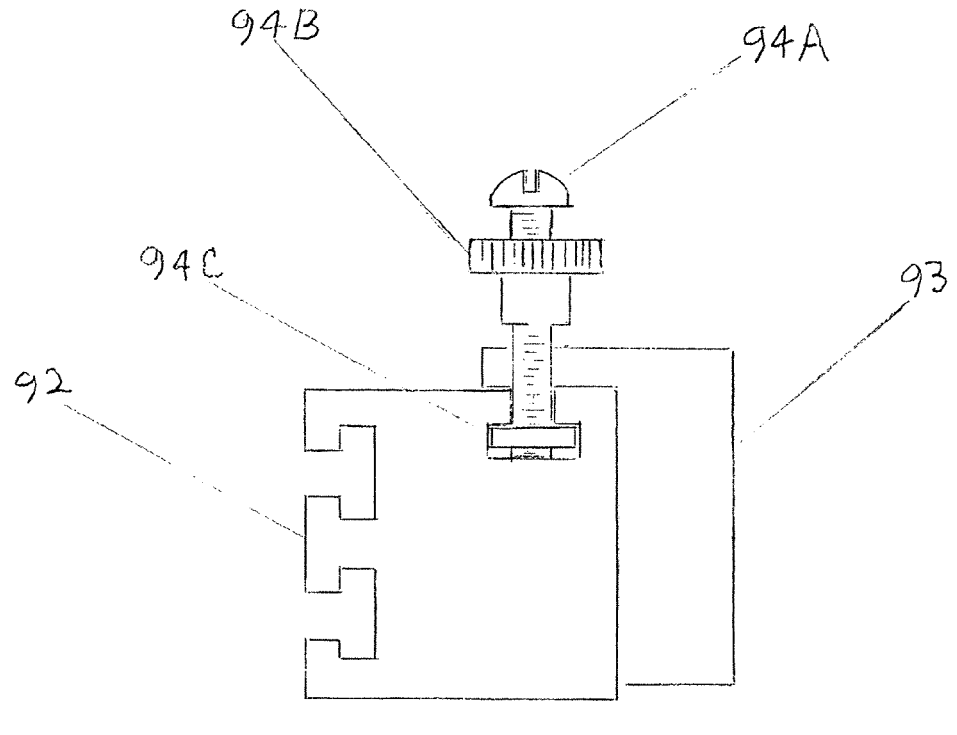
FIG. 12 is an end view of a center-point fence, according to another exemplary arrangement of the present disclosure.

In other exemplary arrangements and methods, as illustrated, for example, in FIG. 10, the template can be used to set stops along the center-point fence 92. In an exemplary arrangement, a center-post insert, 1 is inserted into the table recess and the template start edge A, is set along the X-axis. In this example the template is set over the center-post insert located at the third hole from side C, 2⁵/₁₆" from side A. The fence is positioned flush with side C of the center-point template, 2 and locked down to the table. The T-slot nut assembly, 94, and stop, 93, is slid along the T-track flush with side A of the template and locked in position. After the stop assembly is set, the thumb nut, 94B is loosened and the stop, 93 can be removed from the T-slot nut assembly. As illustrated in FIG. 12, with the set screw 94A screwed tight with the T-track nut 94C, the T-track nut 94C is compressed against the top of the T-track locking the set screw in position. The thumb nut, 94B secures the stop 93 and can be loosened for removal of the stop while maintaining the set location of the set screw 94A. The stop can be easily made from wood, die cast, or molded from any suitable material.

The fence clamping knob, 95 is loosened and the fence can now be set to the X-axis using one of the set-up methods described herein.

Many drill press tables do not have T-slots as they were made to drill metal. Therefore, a woodworker will buy or make their own table to attach to their drill press table. The purchased tables will most likely have a pair of extruded aluminum T-Tracks recessed into the table. The DIY tables can have several styles of track as desired.

Consequently, a guide bar assembly that accommodates all sizes and locations of T-slots or tracks while keeping the fence centered and aligned with the drill bit or router bit allowing holes to be located a precise distance from the center of the drill bit to a stop along the Y axis. This fence in combination with the template to locate holes along the X axis greatly improves accurately locating of holes.

Figure 11:
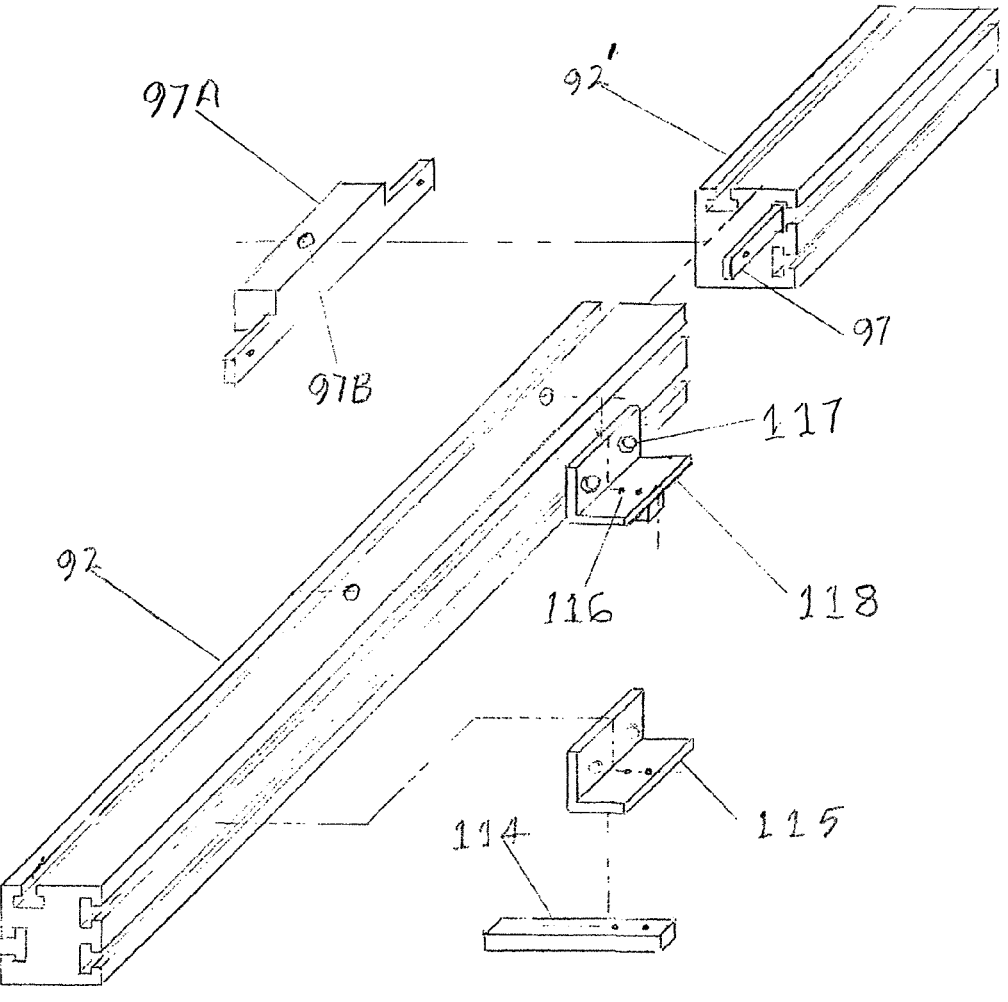
FIG. 11 is an exploded rear perspective view of a center-point fence, according to another exemplary arrangement of the present disclosure.

FIG. 11 illustrates an exemplary fence having two T-tracks along the back surface with one of the slots receiving a pair of sliding guide bar assemblies. The guide bar assemblies 116 include a single or twin pilot sliding track nut (not shown—disposed in lower rear track), an angle or bracket 115 with an attached guide bar 114 and one or two screws or bolts 117 to fasten the angle to the track nut(s). The angle and guide bar can be made from ferrous or non-ferrous metal or die cast or molded as one piece. The guide bars may have a width slightly less than the minimum ⁵/₁₆" T-slots in some drill press tables. The distance between the slots can vary. When used in pairs the guide bar assemblies will clamp along the inside or outside face of the T-slot or T-track.

FIG. 11 also illustrates a fence extension 92', which may be of the same design and material. For a router table two equal length sections of fence 92, 92' could be assembled to the table with the fences separated at the center-point. A spacer block 97A (e.g., including track insertable extension bar portions, as shown) having a center-point hole 97B may be used (e.g., instead of the extension bar 97) to separate the fences 92, 92' at fixed dimensions to accommodate various router bit diameters. This separation allows a dust cover adaptor to be used to help collect dust and shavings produced by router bits. A taller fence face could be added to the fence using a T-slot added to the fence front.

What is claimed is:

1. A system for locating a drill press or router table fence, comprising:
    a center-post insert for installation in an inset recess of a table, the center post insert having a protrusion located in a central portion of said center-post insert;
    a center-point template having a plurality of openings sized to closely receive said center-post insert, wherein said openings are located at a range of predetermined distances; and
    a fence having a securing mechanism, said fence being positionable at a distance set by said center-point template;
    wherein said center-point template is configured to be placed on said center-post insert at a chosen opening, and said fence is secured against said center-point template at a distance determined by said chosen opening.

2. The system of claim 1, further comprising the table having the inset recess.

3. The system of claim 1, further comprising first and second dowel rod stops for assembly with the table to secure the fence at the set distance.

4. The system of claim 3, wherein each of said dowel rod stops has a T-bolt installed at a flat end of said dowel rod stop and a clamping knob installed at an opposite end of said dowel rod stop, said clamping knob used to secure said dowel rod stop to said table.

5. The system of claim 1, further comprising a blank insert having an outer perimeter that matches an outer perimeter of the center-post insert.

6. The system of claim 1, wherein said securing mechanism comprises a clamping fastener.

7. The system of claim 1, wherein said plurality of openings are organized on said center-point template in two sets of opposite angled parallelograms.

8. The system of claim 1, wherein the center-point template comprises at least forty openings.

9. The system of claim 1, wherein the center-post insert comprises a panel, a cylindrical protrusion, a secondary support piece, and two screws.

10. The system of claim 1, wherein the fence includes a T-square guide bar, a first T-slot for stops, and a second T-slot for an extension bar.

11. The system of claim 10, wherein the fence accepts a plurality of fasteners along said first T-slot to secure stops at different distances where a workpiece can be secured against.

12. The system of claim 11 wherein the stop assembly has a set screw to lock against the bottom of the T-slot.

13. The system of claim 12 wherein the thumb nut can be loosened to remove the stop without dislodging the set screw.

14. A method for operating a system for locating a drill press or router table fence, comprising:
    placing a center-post insert into an inset recess on a workshop table;
    placing a center-point template on top of said center-post insert using one of a plurality of openings sized to closely receive said center-post insert;
    positioning a fence along an edge of said center-point template at a position determined by the selected opening;
    securing said fence against said center-point template using a securing mechanism;
    removing said center-point template from said center post insert;
    removing said center-post insert from said inset recess;
    placing a blank insert into said inset recess; and
    positioning a workpiece against said fence.

15. The method of claim 14, further comprising providing two dowel rod stops assembled with the workshop table, said dowel rod stops being operable to slide along said workshop table and secure flush against said fence, allowing said fence to be removed and reset after said blank insert is placed into said inset recess.

16. The method of claim 14, wherein said fence includes a T-square guide bar, a first T-slot for stops, and a second T-slot for an extension bar.

17. The method of claim 14, further comprising providing a single dowel rod stop on said workshop table, said stop able to slide along said workshop table and secure flush against said fence, allowing said fence to be removed and reset after said blank insert is placed into said recess.

* * * * *